Patented Feb. 3, 1953

2,627,489

UNITED STATES PATENT OFFICE 2,627,489

INSECT REPELLENTS

Nathan L. Drake, College Heights, Md., and Sidney Melamed, Philadelphia, Pa., assignors to the United States of America as represented by the Secretary of the Army No Drawing. Original application January 11, 1949, Serial No. 70,384. Divided and this application August 30, 1950, Serial No. 187,832

11 Claims. (Cl. 167—30)

This application is a division of our application Serial No. 70,384, filed January 11, 1949, for Insect Repellents (now abandoned).

This invention relates to insect repellents.

We have found that the application of a monoester of a saturated fatty acid and a saturated paraffinic (alkyl), including cycloparaffinic, diol, when applied to the human skin or to a fabric, effectively repels insects, particularly *Aëdes aegypti* and *anopheles quadrimaculatus*. These monoesters may be represented by the general general formula HO—R—OAc wherein R represents the residue of a paraffin having an open or a closed chain, and Ac represents the acyl residue of a saturated fatty acid having from 3 to 7 carbon atoms inclusive, the sum of the carbon atoms in the R and Ac groups being at least 8.

Examples of diols whose esterification products are insect repellents within the scope of this invention are, for instance, glycol, propanediol, pentanediol, hexanediol, nonanediol, cyclohexanediol; among suitable esterifying acids are, for instance, acetic acid, propionic acid, butyric acid, pivalic acid, caproic acid, enanthic acid.

Tests to measure the repellency of the above-mentioned compounds against insects by skin application were conducted by smearing the compound on the arms of test personnel, who then thrust their arms into cages containing insects. The arms were exposed for 30-minute intervals at 3 minutes each until the first insect bite.

Tests to measure the repellency of fabrics impregnated with the above-mentioned compounds against insects were conducted by uniformly impregnating mercerized cotton hose with the compound at a rate equivalent to 3.3 gms. per sq. ft., drawing the dried hose over the arms of test personnel, who then thrust their covered arms into cages containing insects for 1 to 2 minutes. If no bites or less than 5 bites were received, the tests were repeated each successive day until 5 or more bites during one exposure were received.

The following table illustrates the results obtained by the above test methods against *Aëdes aegypti* and *Anopheles quadrimaculatus*, as examples of insects against which the invention is applicable, by using compounds in accordance with the present invention:

*a*. MONOESTERS

| Material | Insect Repellency Upon Application to Skin | | Insect Repellency of Impregnated Fabric Against Aëdes aegypti |
|---|---|---|---|
| | Aëdes aegypti | Anopheles quadrimaculatus | |
| | Mins. | Mins. | |
| glycol monocaproate | 200 | 60 | over 10 days. |
| 1,2-propanediol monocaproate | 209 | 80 | Do. |
| 1,3-propanediol monocaproate | 207 | 37 | Do. |
| 1,5-pentanediol monopropionate | 216 | 53 | Do. |
| 1,5-pentanediol monoenanthiate | 262 | 32 | at least 1 day. |
| 1,3-cyclohexanediol monopropionate | 250 | 59 | over 10 days. |
| 1,3-cyclohexanediol monobutyrate | 267 | 67 | Do. |

*b*. DIESTERS

| | | | |
|---|---|---|---|
| 1,5-pentanediol dipropionate | 170 | 98 | |
| 1,5-pentanediol dipivalate | 259 | 65 | over 10 days. |
| 1,9-nonanediol diacetate | 224 | 75 | at least 1 day. |
| 1,3-cyclohexanediol diacetate | 216 | 72 | Do. |

The esters contemplated by the present invention may be prepared by reacting (usually refluxing) the diol with acid or acid anhydride or acyl chloride, preferably in the presence of a catalyst e. g., toluenesulfonic acid. In the case of a monoester, the diol is present in excess, while for a diester an excess (at least 2 mols) of acid or acyl chloride are used in the reaction mixture per 1 mol of diol.

The following examples illustrate the preparation of several typical compounds enumerated in the above table:

Example 1

60 gms. of glycol (about 1 mol) are reacted with 60 gms. of caproic acid (about .5 mol) in the presence of 100 cc. of chloroform. The reaction product is washed and distilled; the yield is 40 gms. of glycol monocaproate, a liquid boiling at 80° C. at .3 mm. pressure and having a refractive index of $n_D^{25.5}=1.4308$.

Example 2

40 gms. of 1,2-propanediol and 84.5 gms. of caproic anhydride are refluxed in the presence of 100 cc. of toluene. The reaction products, namely caproic acid and 1,2-propanediol monocaproate, are separated by distilaltion. 36 gms. of 1,2-propanediol monocaproate are obtained, a liquid boiling at 77° C. at .3 mm. pressure and having a refractive index of $n_D^{20}=1.4326$.

*Example 3*

40 gms. of enanthyl chloride (prepared by reacting 50 gms. of enanthic acid and 47 gms. of thionyl chloride) are reacted with 34 gms. of pentanediol to the presence of 79 gms. of pyridine. The yield is 51 gms. of 1,5-pentanediol monoenanthate, a liquid boiling at 119° C. at .2 mm. pressure and having a refractive index of $n_D^{20}=1.4439$.

*Example 4*

60 gms. of 1,3-cyclohexanediol are reacted with 36.9 gms. of butyryl chloride in the presence of 79 gms. of pyridine. The yield is 43 gms. of 1,3-cyclohexanediol monobutyrate, a liquid boiling at 98° C. at .2 mm. pressure and having a refractive index of $n_D^{20}=1.4594$.

*Example 5*

448 gms. of 1,5-pentanediol (4.3 mols) are reacted by refluxing with 750 gms. of propionic acid (about 10 mols) in the presence of 750 gms. of benzene and 14 gms. of p-toluenesulfonic acid catalyst. The water formed as by-product of the condensation reaction is continuously separated, and the diester (1,5-pentanediol dipropionate) is separated by distilling. The yield is 700 gms. of 1,5-pentanediol dipropionate, a liquid boiling at 92–93° C. at .4 mm. pressure and having a refractive index $n_D^{19}=1.4304$.

*Example 6*

35 gms. of 1,9-nonanediol are reacted with 50 gms. of acetic anhydride in the presence of toluene. The yield is 41 gms. of 1,9-nonanediol diacetate, a liquid boiling at 107° C. at .2 mm. pressure and having a refractive index of $$n_D^{20}=1.4359.$$

*Example 7*

30 gms. of 1,3-cyclohexanediol (.26 mol) are reacted with 41 gms. of acetyl chloride (.52 mol) in the presence of 79 gms. of pyridine. The yield is 38 gms. of 1,3-cyclohexanediol diacetate, a liquid boiling at 83° C. at a pressure of under 1 mm. and having a refractive index of $$n_D^{20}=1.4502.$$

For ease of application the compounds contemplated by the present invention may be incorporated in a suitable inert liquid or solid carrier such as mineral oil, alcohol, petrolatum, etc. For facile and uniform fabric impregnation, they may be applied in an inert solvent, such as alcohol, ether, etc.

Having thus described our invention,
We claim:

1. A process of rendering a fabric insect repellent comprising impregnating said fabric with 1,3-cyclohexanediol monopropionate.

2. An *Aëdes aegypti* repellent fabric comprising fabric impregnated with a monoester, said monoester being the esterification product of a saturated fatty acid having from 3 to 7 carbon atoms inclusive and of a member of the group consisting of 1,5-pentanediol and 1,3-cyclohexanediol.

3. An *Aëdes aegypti* repellent fabric comprising fabric impregnated with 1,5-pentanediol monopropionate.

4. An insect repellent fabric comprising fabric impregnated with 1,3-cyclohexanediol monopropionate.

5. A process of repelling insects comprising applying 1,3-cyclohexanediol monopropionate to the skin.

6. An *Aëdes aegypti* repellent fabric comprising fabric impregnated with a monoester having at least 8 carbon atoms, said monester being the esterification product of a paraffinic, including cycloparaffinic diol and of a saturated fatty acid having from 3 to 7 carbon atoms inclusive.

7. An *Aëdes aegypti* repellent composition comprising, in a non-gaseous inert organic carrier, a monoester having at least 8 carbon atoms, said monoester being the esterification product of a paraffinic, including cycloparaffinic diol and of a saturated fatty acid having from 3 to 7 carbon atoms inclusive.

8. An *Aëdes aegypti* repellent composition comprising, in a non-gaseous inert organic carrier, a monoester, said monoester being the esterification product of a saturated fatty acid having from 3 to 7 carbon atoms inclusive and of a member of the group consisting of 1,5-pentanediol and 1,3-cyclohexanediol.

9. The monoesters of a saturated fatty acid having from 3 to 7 carbon atoms inclusive and of cyclohexane diol.

10. An *Aëdes aegypti* repellent composition comprising pentanediol monopropionate in a non-gaseons inert organic carrier.

11. An insect repellent composition comprising cyclohexanediol monopropionate in a non-gaseous inert organic carrier.

NATHAN L. DRAKE.
SIDNEY MELAMED.

REFERENCES CITED

The following references are of record in the file of this patent:

UNITED STATES PATENTS

| Number | Name | Date |
|---|---|---|
| 2,302,159 | Wasum | Nov. 17, 1942 |
| 2,446,505 | Arenson | Aug. 3, 1948 |

OTHER REFERENCES

Linduska et al., "Flea repellents for use on clothing." J. Econ. Entomology, vol. 39, No. 6, December 1946, pages 767–769. Entries: Lauric acid, propylene glycol monoester; and propionic acid, pentamethylene diester.

Newman et al., "Some new compounds as possible insect repellents." J. A. C. S., vol 68, October 1946, pages 2112–2115. Entries: Ethylene glycol mono (n) valerate, and 1,2-propylene glycol, monophenylacetate.

Beilstein, vol. VI, pages 739–741.

Beilstein, vol. VI, 2nd supplement (1944), pages 743–749.

Beilstein, "Handbuch der organischen Chemie," vol. II (1920), pages 272 and 313.

OSRD Insect Control Committee Report No. 28, Interim Report No. O-94, May 18, 1945. Esp. page 38, O-6311, Phenoxyacetic acid, 1,3-propanediol monoester.